(12) United States Patent
Heseltine (10) Patent No.: US 11,236,553 B2
(45) Date of Patent: Feb. 1, 2022

(54) ROD OR TUBE LIFTING APPARATUS (71) Applicant: KAUS BOREALIS PTY LTD, Camira (AU)

(72) Inventor: Hylton Andrew Heseltine, Brookfield (AU)

(73) Assignee: Kaus Borealis PTY LTD, Camira (AU)

( * ) Notice: Subject to any disclaimer, the term of this patent is extended or adjusted under 35 U.S.C. 154(b) by 0 days.

(21) Appl. No.: 16/341,696

(22) PCT Filed: Oct. 13, 2017

(86) PCT No.: PCT/AU2017/051112
§ 371 (c)(1),
(2) Date: Apr. 12, 2019

(87) PCT Pub. No.: WO2018/068099
PCT Pub. Date: Apr. 19, 2018

(65) Prior Publication Data
US 2019/0284884 A1 Sep. 19, 2019

(30) Foreign Application Priority Data
Oct. 14, 2016 (AU) .............................. 2016904168

(51) Int. Cl.
*E21B 19/06* (2006.01)
*E21B 17/042* (2006.01)
(Continued)

(52) U.S. Cl.
CPC ................ *E21B 19/06* (2013.01); *E21B 3/02* (2013.01); *E21B 17/042* (2013.01);
(Continued)

(58) Field of Classification Search
CPC .......... E21B 19/06; E21B 3/02; E21B 17/042; E21B 17/046; E21B 19/16; F16L 15/00; F16L 15/08
See application file for complete search history.

(56) References Cited

U.S. PATENT DOCUMENTS 1,507,991 A * 9/1924 Edwards ............... E21B 17/046
285/330
1,721,024 A 7/1929 Krell et al.
(Continued)

OTHER PUBLICATIONS

International Search Report for PCT/AU2017/051112, dated Dec. 7, 2017.
(Continued)

*Primary Examiner* — Nicole Coy
(74) *Attorney, Agent, or Firm* — Finnegan, Henderson, Farabow, Garrett & Dunner, LLP (57) ABSTRACT

Disclosed is an apparatus for connecting to a tube or a rod in a longitudinal axial direction of the tube or rod. The tube or rod is used in the assembly of a tube or rod string. The apparatus comprises an engagement member adapted to engage with an engagement 5 portion located at an end of the tube or rod. The apparatus also comprises an abutment member associated with the engagement member. The abutment member is adapted to abut an abutment portion of the tube or rod. The apparatus is adapted such that, when the engagement member is engaged with the engagement portion and the abutment member abuts the abutment portion, the abutment member can apply a locking force to the abutment 0 portion in the axial direction of the tube or rod, being a force that secures the engagement member to the engagement portion such that the tube or rod can be lifted and moved.

10 Claims, 8 Drawing Sheets

(51) Int. Cl.
  *E21B 19/16* (2006.01)
  *E21B 17/046* (2006.01)
  *F16L 15/08* (2006.01)
  *E21B 3/02* (2006.01)

(52) U.S. Cl.
  CPC ............ *E21B 17/046* (2013.01); *E21B 19/16* (2013.01); *F16L 15/08* (2013.01)

(56) References Cited

U.S. PATENT DOCUMENTS

| | | | | |
|---|---|---|---|---|
| 3,203,460 A | * | 8/1965 | Kuhne | .................. E21B 17/043 411/263 |
| 3,278,220 A | * | 10/1966 | Pickering | ................ E21B 19/06 294/86.25 |
| 4,522,430 A | * | 6/1985 | Stromberg | .............. E21B 17/02 285/24 |
| 4,624,483 A | * | 11/1986 | Stromberg | .............. E21B 17/02 285/24 |
| 5,169,183 A | | 12/1992 | Hallez | |
| 5,785,357 A | | 7/1998 | Foster et al. | |
| 6,030,004 A | | 2/2000 | Schock et al. | |
| 7,117,938 B2 | | 10/2006 | Hamilton et al. | |
| 7,438,127 B2 | | 10/2008 | Lesko | |
| 7,669,662 B2 | * | 3/2010 | Pietras | .................... E21B 19/06 166/381 |
| 9,638,362 B2 | * | 5/2017 | Marchand | ............. F16L 15/007 |
| 2010/0308577 A1 | | 12/2010 | Chin | |

OTHER PUBLICATIONS

Communication with Supplementary Partial European Search Report for Application No. EP 17860380.9 (PCT/AU2017051112), dated Aug. 10, 2020 (9 pages).

\* cited by examiner

ROD OR TUBE LIFTING APPARATUS

TECHNICAL FIELD

This disclosure generally relates to apparatus and methods for lifting rod or tube. The apparatus and methods find particular, though not exclusive, application in the servicing and drilling of wells such as for oil and gas.

BACKGROUND ART

A number of specialised pieces of equipment are used for lifting rod, pipe tube and casing to and from wells, in and out of wells, and in the making or breaking of rod strings. These specialised pieces of equipment include elevators of various types including sucker rod elevators, tube elevators, rod elevators, pipe elevators casing elevators, double/centre latch drill pipe elevators and side door elevators. The elevators are used for raising and lowering the string in the well and for adding or removing rod, tube or casing to the string. Power tongs are typically used for spinning and make & break functions to connect and disconnect the rod, pipe, tube, casing to and from the string. Generally, elevators are configured to engage with an outer surface of the tube or rod. The elevators may have jaws or other similar mechanisms to prevent the tube or rod from falling out of the elevator.

During drilling, workover, completions, maintenance and repair works, a drill rig, flushby rig, workover rig or other rig or apparatus may be used to trip casing, drill pipe, tubing and sucker rods into or out of a well. Currently tripping operations are typically not hands-free. This means that the tripping process requires rig personnel to handle the rod, pipe, tube, casing and the make & break and spinning equipment to make the connections of additional rod, tubing and casing to the string, individually or in combination of any of the aforementioned operations. Breaking and spinning off the rod, pipe, tube or casing from the string can place the rig personnel in harm's way, and can lead to injuries which can be fatal.

It is to be understood that references herein to the prior art do not constitute an admission that such art forms a part of the common general knowledge of a person of ordinary skill in the art, in Australia or any other country.

SUMMARY OF THE DISCLOSURE

Disclosed herein is an apparatus for connecting to a tube or a rod in a longitudinal axial direction of the tube or rod, the tube or rod being used in the assembly of a tube or rod string. The apparatus comprises an engagement member adapted to engage with an engagement portion located at an end of the tube or rod, and an abutment member associated with the engagement member. The abutment member is adapted to abut an abutment portion of the tube or rod.

The apparatus is adapted such that, when the engagement member is engaged with the engagement portion and the abutment member abuts the abutment portion, the abutment member can apply a locking force to the abutment portion in the axial direction of the tube or rod, being a force that secures the engagement member to the engagement portion such that the tube or rod can be lifted and moved.

Applying a locking force in the axial direction of the tube or rod may eliminate the need to apply substantial torque to engage the apparatus with the tube or rod. The locking force may be equivalent to a torque approximately required to pre-load a joint formed between the engagement member and engagement portion. Generally, the pre-load torque is specified by a manufacturer of the tube or rod. The locking force, therefore, is determined by the type of tube or rod and the associated pre-load torque required. By pre-load, it is meant the torque applied to a joint formed between the engagement member and engagement portion before a load of the associated string is applied to the joint. Any use herein of the term "torque" is therefore to be taken to mean the pre-load torque unless the context clearly indicates it to be otherwise.

By axial direction, it is meant an axis extending along a longitudinal direction of the tube or rod from one end face (i.e. top) to the other end face (i.e. bottom) of the tube or rod. For example, in the case of tube or rod having a bore extending therethrough from the pin to the box, such as those used on a flush by rig, the longitudinal axis is the axis extending in the direction of the bore.

As an example, a locking force required to engage and move a sucker rod is generally equivalent to approximately 650 Nm of torque. For example, ⅝ inch sucker rod generally requires a locking force equivalent to approximately 300 Nm of torque pre-load, whereas 1⅓% inch sucker rod generally requires a force equivalent to approximately 7,000 Nm of torque pre-load. This is to be compared with tubing, which generally requires a force equivalent to approximately 20,000 Nm of torque pre-load, and casing which generally requires a force equivalent to approximately 50,000 Nm of torque pre-load.

In existing setups, applying such torques generally requires specialised machinery. Further, when operators are required to operate machinery, such as power tongs, to apply such torque, they can be exposed to hazardous working practices. Therefore, using an abutment member to apply the locking force may reduce hazardous working practices when moving tube or rod. Further, applying the apparatus to the tube or rod may eliminate the requirement to use elevators to engage the tube or rod (i.e. for raising or lowering the tube or rod) thereby removing exposure to operating elevators for this particular operation.

The abutment member may apply the locking force by pressing against the engagement portion of the tube or rod in the axial direction. Because the abutment member is abutted against the abutment portion when the locking force is applied, the abutment member may only need to move a small distance to apply the locking force. For example, the abutment member may move less than 1.0 mm, such as approximately 0.3 mm, with respect to the apparatus and towards the abutment portion. The distance the abutment member moves to apply the locking force can be determined by the amount of play between the engagement member and the engagement portion, before the engagement member is secured to the engagement portion.

The abutment member may be moved by a linear actuator. A hydraulic ram may be used to move the abutment member. The hydraulic ram may be positioned towards a head of the apparatus. The locking force required to secure the engagement member to the engagement portion may vary depending on the tube or rod. To provide the locking force, the abutment member may apply a force adequate to prevent loosening of the joint. Generally, the force is such that the joint does not loosen during use of the rod, for example, when the apparatus is used to suspend the weight and/or rotate a string.

The engagement member may have a first thread defined as part of the apparatus. The engagement portion may have a second thread that is complementary to the first thread. In this way, the engagement member and the engagement portion can be engaged with each other by screwing the two together. Therefore, once the locking force is applied, the first and second threads abut so as to be secured to one another. In this way, the locking force forces the faces of the threads together much in the same way that an applied torque would force the faces of the threads together when screwing the first thread and second thread together.

In an embodiment, the first thread is on a female portion of the apparatus and the second thread is on a corresponding male portion of the tube or rod, or vice versa. In this way, the apparatus may be able to connect to tube or rod being in the "pin up" or "box up" orientation. In the pin up orientation, the tube or rod has the engagement portion on the male (outside) surface, whereas in the box up orientation that tube or rod has the engagement portion on the female (inside) surface. Having the apparatus being able to connect to rod in a pin up or box up orientation may allow the apparatus to be used on a wide variety of tube or rod.

Typically, a pin end of a first tube or rod is designed to be secured to a box end of an adjacent second tube or rod. The first and second tube or rods are generally of the same type, whereby connection of a plurality of tube or rods forms an associated string, such as a drill string and drill rod. However, the diameter of the drill string or drill rod may vary, and tube or rods having different diameters may be used to form such strings of tubes or rods.

The apparatus may be adapted so that a torque of 5 to 250 Nm of torque or more is required to screw the engagement member to the engagement portion prior to applying the locking force. The amount of torque required to screw the engagement member to the engagement portion typically varies with the type of tube or rod, whereby smaller and tighter tube or rod typically requires less torque compared to larger and heavier tube or rod. Rotation to screw the engagement member to the engagement portion may be provided by rotating the tube or rod by e.g. a rotatory table or top drive or similar rotation member.

Alternatively, the apparatus may be adapted to rotate the engagement member. To do this, the apparatus may be provided with a gearbox that can be powered by a hydraulic motor. Hydraulic motors are generally used since hydraulic power is often associated with drill rigs. However, electric or compressed air motors could also be used in place of or in addition to the hydraulic motor. The apparatus may be adapted to rotate the tube or rod once the locking force is applied. The hydraulic ram that may move the abutment member may also be associated with the gearbox and/or motor.

The abutment member may also be adapted to apply a radial compressive force. The compressive force may be provided by an auxiliary abutment member associated with the abutment member. The abutment member and/or auxiliary abutment member may have complementary tapered surfaces. Therefore, movement of the abutment member and/or the auxiliary abutment member in the form of a compression sleeve may provide the compressive force. Providing a compressive force in addition to the locking force may help to further secure the engagement member to the engagement portion.

The engagement member may form a conduit. The conduit may allow fluid communication with a passage in the tube or rod when the apparatus is secured to the tube or rod. The apparatus may have a swivel or top drive to allow fluid communication between a Kelly hose and the passage in the tube or rod. Therefore, a fluid, such as drilling mud, may be passed through the apparatus and into the tube or rod. However, in some embodiments the engagement member may not have a conduit, for example, in circumstances when a fluid does not need to be pumped through the tube or rod.

The engagement member may sleeve the abutment member, or vice versa. In this way, the abutment member may be coaxially arranged with the engagement member. When the engagement member sleeves the abutment member, the engagement member may be in slideable contact with the abutment member. The slideable contact may allow the abutment member to move in a circumferential and/or axial direction of the engagement member. Bearings and/or lubricating fluids may be positioned between the engagement member and abutment member.

To move the tube or rod, the apparatus may be connected to a rope located on a drill rig, a workover rig, a flushby rig or a data gathering rig. Since the apparatus may be provided with a motor to rotate the engagement member, torsional forces generated by the apparatus when screwing the engagement member to the engagement portion may be transferred to the rope. The rope may be of steel wire rope construction. The wire rope can have a diameter of 10-68 mm or more. The design and diameter of the wire rope is typically determined by the rig, the size of the tube or rod and associated string, and the intended use of the string.

Irrespective of the torque required to engage the engagement member with the engagement portion prior to applying the locking force, the apparatus may allow hands-free connection between the apparatus and the tube or rod. For example, the apparatus may locate the end of the tube or rod, screw the engagement member to the engagement portion, then apply the locking force without the need for an operator to handle the apparatus.

Also disclosed is an apparatus for connecting to a tube or a rod having a threaded portion where the tube or rod is used in the assembly of a tube or rod string. The apparatus comprises a first tubular member and a second tubular member. The first and second tubular members are coaxially arranged around a central axis and movable relative to one another along the central axis. A threaded region is located on the second tubular member, and the threaded region is complementary to the threaded portion on the tube or rod. A radially extending flange is located at an end of the first tubular member for abutting a portion on a rod or tube.

The apparatus may be arranged such that, when the threaded region of the second tubular member is engaged with the thread on the tube or rod and the radially extending flange abuts the portion of the tube or rod, the first tubular member is movable along at least a portion of a length of the central axis relative to the second tubular member to apply a locking force to the portion of the tube or rod in engagement with the flange to secure the apparatus to the tube or rod.

By central axis, it is meant an axis extending along a longitudinal direction of the tubular members from one end face (i.e. top) to the other end face (i.e. bottom) of the tube or rod. The terms top and bottom are relative and are not intended to limit the disclosure to any particular orientation.

The threaded region on the first tubular member may be provided as a male thread. The apparatus may further comprise a threaded region on the first tubular member having a thread pitch the same as the threaded region on the second tubular member so that the threaded regions on the first and second tubular members form a continuous thread that is complementary to the threaded portion on the tube or rod.

The second tubular member may have a conduit to allow for communication of a fluid through the apparatus. The first tubular member may have a conduit to allow fluid communication with the conduit of the second tubular member.

The first and second tubular members may be movable up to 1 mm, such as 0.3 mm, relative to one another along the central axis. The apparatus may further comprise a ram associated with the first and/or second tubular members for moving the first and second tubular members relative to one another along the central axis. The apparatus may further comprise a gearbox in communication with the first and/or second tubular members.

The apparatus may be adapted so that a torque of 5 to 250 Nm or more is required to screw the threaded region on the second tubular member onto the threaded portion on the tube or rod. The inner and outer tubular members may be rotatable around the central axis so as to be moveable relative to one another in a circumferential direction.

The apparatus may be able to carry the weight of a tube or rod string. The weight of the string may be up to about 500,000 pounds, such as about 250,000 pounds to about 300,000 pounds. The weight of the string may be greater than about 500,000 pounds.

Also disclosed herein is a system comprising tube or rod having an engagement portion located at an end of the tube or rod. The system also comprises an apparatus comprising an engagement member adapted to engage with the engagement portion in an axial direction of the tube or rod, and an abutment member associated with the engagement member. As above, the abutment member can be adapted to abut an abutment portion of the tube or rod.

The system is configured such that, when the engagement member is engaged with the engagement portion and the abutment member abuts the abutment portion, the abutment member can apply a locking force to the abutment portion in the axial direction of the tube or rod, being a force that secures the engagement member to the engagement portion such that the tube or rod can be lifted and moved.

In an embodiment, the system may be located on a drill rig, a workover rig, a flushby rig or a data gathering rig. In an embodiment, the system may further comprise a catwalk or other device for storing and/or presenting the tube or rod.

Also disclosed is a method of connecting an apparatus to a tube or rod. As described above, the apparatus comprises an engagement member adapted to engage with an engagement portion located at an end of the tube or rod, and an abutment member associated with the engagement member.

The method comprises engaging the engagement member with the engagement portion so that the abutment member abuts an abutment portion located at the tube or rod. The method also comprises moving the abutment member in an axial direction of the tube or rod so as to apply a locking force onto the abutment portion, whereby the engagement member is secured to the engagement portion.

The tube or rod may be moved once the engagement member has been secured to the engagement portion. The abutment member may be moved up to 1 mm to apply the locking force. The method may further comprise rotating the apparatus and tube or rod once the locking force is applied. Therefore, the apparatus may move the tube or rod by lifting and/or rotation. To lift the tube or rod, the apparatus may be attached to a rope, or to a top drive, or to another mechanism on a mast that can lift the apparatus when the engagement member is secured to the engagement portion.

The engagement member may engage the engagement portion by rotational engagement. For example, the engagement member may be screwed onto the engagement portion. The term "onto" is to be interpreted broadly to mean the engagement member can be screwed onto an outer surface of the engagement portion (i.e. pin up orientation) or can be screwed onto an inner surface of the engagement portion (i.e. box up orientation). The method may be performed using a drill rig, a workover rig, a flushby rig or a data gathering rig. In this way, the apparatus may be moved in a vertical direction using a drill line (e.g. wire rope) associated with the rig. The apparatus may connect and/or disconnect to tube or rod located on a catwalk or other structure of the rig. Connection and/or disconnection to tube or rod on the catwalk may be automated. The apparatus may connect to a drill string associated with the rig. Connection with the drill string may also be automated. In this way, the method may not require any hands-on operator input. The apparatus and/or method may thus provide a hands-free way of making and breaking a drill string.

A fourth aspect provides a drill string assembled or disassembled using the method of the third aspect. The drill string may be, for example, used for drilling, intervention, snubbing, data gathering and/or flushing of wells.

The term tube or rod may be used to identify an individual tube or rod, pipe tube, well casing, a segment of tube or rod, or a drill string or drill rod formed from the individual or segment of tube or rod. These terms are used interchangeably throughout this disclosure.

BRIEF DESCRIPTION OF THE DRAWINGS

Non-limiting embodiments will now be described, by way of example only, with reference to the accompanying drawings, in which.

DETAILED DESCRIPTION OF SPECIFIC EMBODIMENTS

Figure 1:
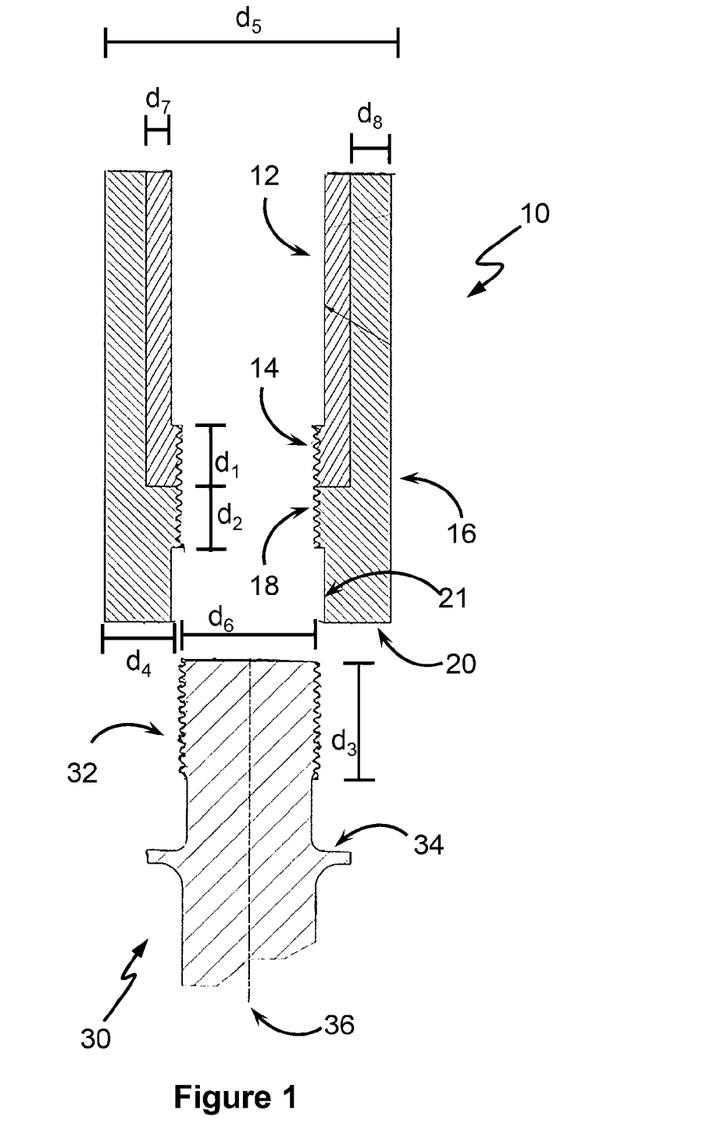
FIG. 1 shows a cross-sectional view of an apparatus disconnected from a tube or rod.
Figure 2:
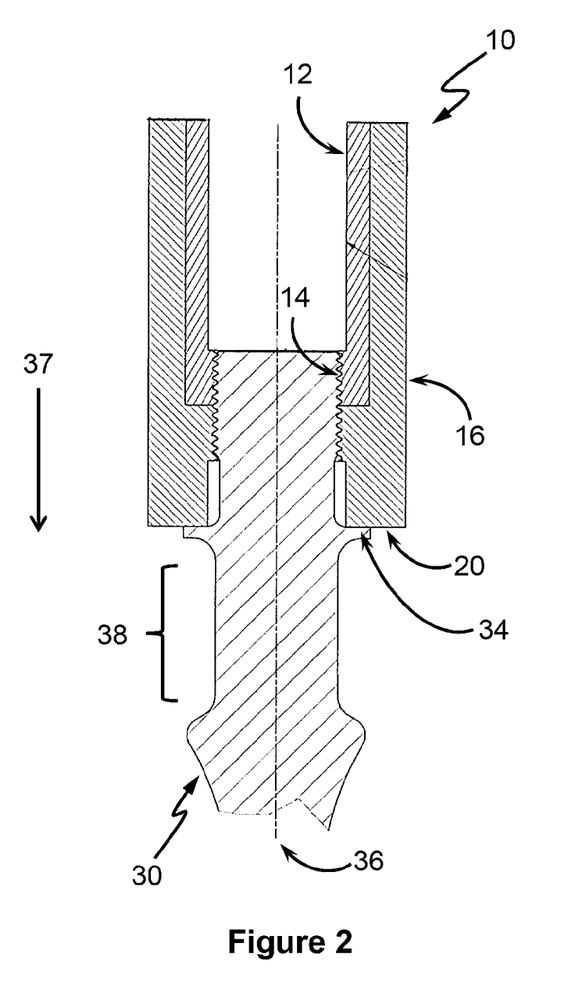
FIG. 2 shows a cross-sectional view of the apparatus of FIG. 1 connected to a tube or rod.

FIGS. 1 and 2 show a first embodiment of an apparatus 10. The apparatus 10 can be employed for lifting rod or tube and the like, such as when servicing and in the drilling of wells (e.g. oil and gas wells, etc.). The tube or rod can be anywhere from ¼" (e.g. sucker rod) to 12" (e.g. well casing) in diameter.

Apparatus 10 has an engagement member in the form of an inner sleeve 12, and an abutment member in a form of an outer sleeve 16 associated with the inner sleeve 12. In the embodiment of FIGS. 1 and 2, the outer sleeve 16 sleeves the inner sleeve 12 so as to be coaxially arranged thereto (i.e. having a common axis). Outer sleeve 16 is also moveable along the common axis (i.e. moveable in the direction of arrow 37) relative to the inner sleeve 12. The outer sleeve 16 also has an internally threaded region 18, which region 18 continues as an internal threaded region 14 of the inner sleeve 12. In this way, threaded region 14 and 18 forms a continuous thread. Bearings and/or lubricating agents can be positioned between the inner and outer sleeve 12/16 so reduce friction between the two during their relative movements.

In the embodiment of FIGS. 1 and 2, the apparatus is adapted to be secured to e.g. tube or rod 30 via an engagement portion, which takes the form of an external thread 32 located at the end of the tube or rod 30. The external thread 32 is able to mate with the threaded region 14, together with the threaded region 18.

In this regard, in the embodiment of FIGS. 1 and 2, the external thread 32 is also able to mate with the outer sleeve 16 via its threaded region 18. However, threaded region 18 need not be provided on all embodiments of the apparatus.

Internally threaded regions 14 and 18, and external thread 32, are complementary to allow for screw inter-engagement. The type of thread is determined by the type and use of tube or rod 30. While engagement of the engagement member and engagement portion is conveniently achieved and illustrated by way of a thread, other engagement mechanisms may be used, such as a bayonet mount, etc. In some embodiments, the length of the threaded region 14 (i.e. distance $d_1$) is about 70-85% of the outer thread 32 length (i.e. length $d_3$) of the tube or rod 30. In some embodiments, the length of the threaded region 18 (i.e. distance $d_2$) is about 15-30% of the outer thread 32 length (i.e. length $d_3$) of the tube or rod 30.

In the embodiment shown in FIGS. 1 and 2, the tube or rod 30 is in the "pin up" orientation, that is, the thread 32 is located on an outside (male) surface of the tube or rod 30. In a pin up orientation, an associated drill string or drill rod is adapted so that the pin is located at the top. In this way, apparatus 10 can be considered as having a box orientation capable of being secured to the pin.

In the tube or rod 30 of FIGS. 1 and 2, it should be observed that a wrench flat region 38 is positioned below the seat 34. The wrench flat region 38 is used for making and breaking a string. The region 38 may be engaged by a hand-held or mechanical wrench.

The tube or rod 30 has a radially extending, circumferential flange in the form of a seat 34 located adjacent the thread 32, such that the seat 34 is able to form an abutment portion. In use, when the threaded region 14 is screwed onto thread 32 so as to be engaged thereto, a radially extending flange forming an end surface 20 (e.g. annulus) of the outer sleeve 16 is brought into abutment with the seat 34, as shown in FIG. 2. The end surface 20 is located at the end of end region 21.

The end surface 20 may extend radially outwards such that a width of the end surface 20 (i.e. distance $d_4$) will be determined by the outer diameter (i.e. distance $d_5$) of the sleeve 16 and the outer diameter of the thread 32 (i.e. distance $d_6$). In some embodiments, the outer diameter ($d_5$) of the sleeve 16 is about 90-120% of the maximum upset diameter of the tube or rod 30. In some embodiments, distance $d_4$ may range from about 15 mm to about 60 mm. In some embodiments, threaded region is about 5 mm to about 20 mm inboard from the end 20. End region 21 of outer sleeve 16 has an inner diameter slightly larger than the outer diameter of the thread 32. This allows the thread 32 to be inserted into the inner sleeve 12 without the thread 32 touching an inner surface of end portion 21. In an embodiment, the inner diameter of end region 21 is about 5% to about 10% larger than distance $d_6$.

When the inner sleeve 12 is coaxially arranged with outer sleeve 16, as shown in FIGS. 1 and 2, the inner sleeve 12 can have a wall thickness (i.e. distance $d_7$) of about 5 mm to about 20 mm, and the outer sleeve can have a wall thickness (i.e. distance $d_8$) of about 10 mm to about 40 mm. Generally, the wall thickness of the inner and outer sleeve 12/16 will increase as the diameter of the thread ($d_6$) increases. For example, $d_7$ may be 5 mm and $d_8$ may be 10 mm when the apparatus is used for ¼" sucker tube or rod, but $d_7$ may be 20 mm and $d_8$ may be 40 mm when the apparatus is used for 12" well casing.

The amount of torque required to engage the threaded region 14 of inner sleeve 12 with thread 32 so that the end surface 20 is bought into abutment with the seat 34 is typically dependent on the type of tube or rod 30. However, in general, the amount of torque is 250 Nm or less. This amount of torque is relatively low compared to the usual amount of torque applied to tube or rod, and can be considered as being "finger tight". A torque greater than "finger tight" may also be used to lock the engagement member with the engagement portion. For example, small and lightweight tube or rod may only require a small torque so as to be "finger tight". The apparatus may apply more force than what is "finger tight", but this torque is generally less than a pre-load torque required to secure inner sleeve 12 to thread 32. For example, "finger tight" may be 50 Nm of torque but the apparatus applies 100 Nm of torque, and the locking force for the given tube or rod may be equivalent to 5,000 Nm of torque pre-load.

The weight of the individual tube of rod lifted by the apparatus can be from tens of kilograms, for example tube or rod used on a flushby rig, to a few hundred kilograms, for example tube or rod used to form a well casing. However, once the individual tube or rod is then connected to the tube or rod string, the weight of the tube or rod string can then be carried by the apparatus 10. The weight of the tube or rod string can be anywhere up to about 500,000 pounds, such as about 250,000 pound to about 300,000 pounds. The weight of the string may be greater than about 500,000 pounds. The weight of the tube or rod string will depend on the length of the string and the type of tube or rod used to construct the string. Because the apparatus can be attached to a drawworks associated with the rig, the weight of the tube or rod string can be transferred from the apparatus 10 to the rig.

Once the threaded region 14 of inner sleeve 12 and thread 32 are engaged (i.e. "finger tight" so that the tube or rod 30 is in a fixed relationship to inner sleeve 12) and end 20 is in abutting engagement with seat 34, the outer sleeve 16 is moved relative to the inner sleeve 14 an axial direction of the tube or rod 36 (i.e. moved in the direction of arrow 37) so that the end 20 applies a force to the seat 34. Once the force reaches a predetermined level, a locking force is achieved in which the threaded region 14 is securely joined to the thread 32. By "securely joined", it is meant that threaded region 14 and thread 32 are aligned and abut one another in such a way as to resemble a joint that has been tightened with a force equivalent to the pre-load torque e.g. 20,000 Nm. Put another way, the locking force provides a friction force between threaded region 14 and thread 32 so that the two cannot move with respect to one another, thereby locking the apparatus 10 to the tube or rod 30. In this way, the apparatus 10 first engages with rod or tube 30, then the locking force is applied from the apparatus to the tube or rod 30 so as to secure the apparatus 10 to the tube or rod 30. Once a sufficient locking force has been achieved, the apparatus is able to lift and move the tube or rod 30 without the possibility of the tube or rod undoing from the apparatus 10. Therefore, apparatus 10 can be used as a rod elevator. The outer sleeve 16 is moved up to about 1 mm in some embodiments, such as about 0.05 mm, 0.1 mm, 0.2 mm, 0.3 mm, 0.4 mm, 0.5 mm, 0.6 mm, 0.7 mm, 0.8 mm, 0.9 mm or 1 mm, relative to the inner sleeve 14 to apply the locking force.

It should be appreciated that the locking force exerts a pressure at seat 34, and that the pressure is a function of the force applied to seat 34 and the contact surface area between end surface 20 and seat 34.

The amount of the locking force exerted onto seat 34 by outer sleeve 16 is dependent on the type of tube or rod 30. For example, the locking force required for tubing is generally much greater than for sucker rod. By way of specific example, the amount of force applied to seat 34 by outer sleeve 16 can equate to a pre-load locking force of approximately 650 Nm of torque. Forces which equate to a pre-load locking force of approximately 20,000 Nm of torque can also be applied. Forces which equate to a pre-load locking force of greater than 20,000 Nm of torque can be applied, such as 50,000 Nm. The apparatus 10 may apply a force equivalent to a pre-loading force of about 500-25,000 Nm. Because the distance that the outer sleeve 16 moves can be varied, the amount of force exerted onto seat 34 can also be varied. Therefore, apparatus 10 can be secured to a variety of tubes or rods using a variety of locking forces. The outer sleeve 16 is moved using a linear actuator (not shown). The linear actuator can be associated with a head 11 of the apparatus (see FIG. 7). The linear actuator can take the form of a hydraulic ram.

As set forth above, in the embodiment of FIGS. 1 and 2, the outer sleeve 16 is provided with the threaded region 18. If the end 20 is unable to abut seat 34, for example due to the presence of debris or due to incorrect engagement of inner sleeve 12 with securing portion (i.e. with thread 32), the threads 18 of the outer sleeve 16 can instead abut threads 32 so as to provide the locking force.

Figure 2A:
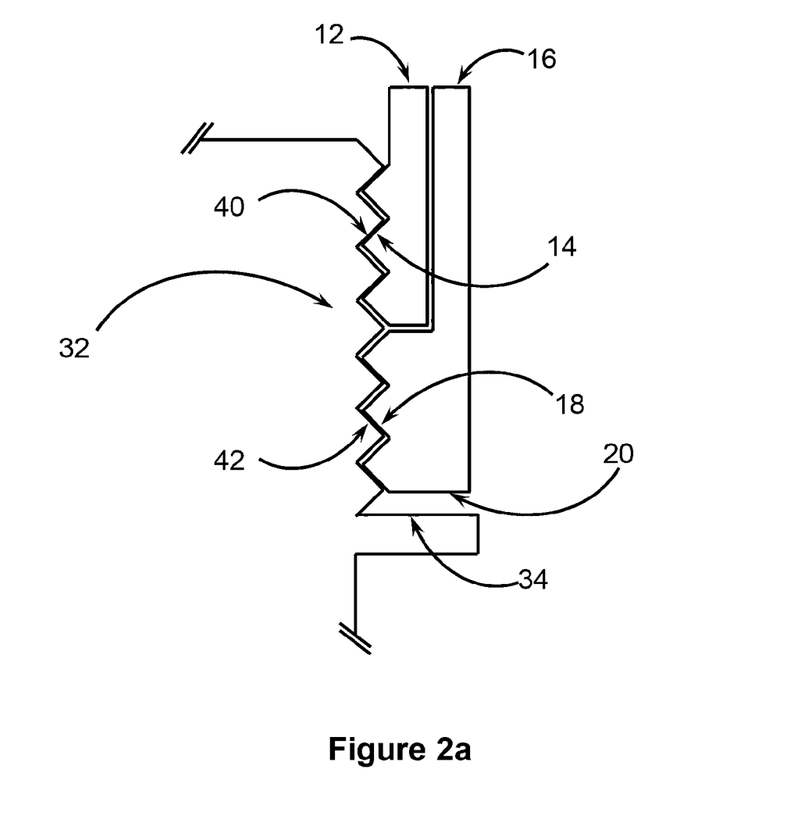
FIG. 2a shows a close up (detail) of a portion of the apparatus of FIG. 2.

In this regard, and as best shown in FIG. 2a, thread 32 is circumferentially positioned on the outer surface of tube or rod 30 and has a first surface 40 and second surface 42. When the outer sleeve 16 moves in an axial direction towards seat 34, the threaded region 14 of the inner sleeve 12 is moved to abut the first surface 40, and the threaded region 18 from the outer sleeve 16 moves to abut the second surface 42. In this way, the force applied to the second surface 42 can be approximately the same as that what would have been applied to seat 34. However, it is generally preferred for end 20 to abut seat 34 prior to applying the locking force so as to evenly distribute the locking force and to minimise interlocking of threads 14, 18 and 32.

To disengage the apparatus 10 from the tube or rod 30, the locking force is removed by moving outer sleeve 16 away from seat 34, then the inner sleeve 12 is disengaged from the threads 32. In the embodiment of FIGS. 1 and 2, this means unscrewing threaded region 14 from threads 32. Once the locking force is removed, the only force required to unscrew (i.e. disengage) the threaded region 14 from the thread 32 is a counteracting torque that is approximately similar to the "finger tight" force require to engage threaded region 14 with thread 32. Having to only apply a relatively small "finger tight" counteracting force to disengage the sleeves 12 and 16 from tube or rod 30 can simplify the disengagement process since the majority of the force used to secure the apparatus 10 to the tube or rod 30 is removed when the locking force is removed by moving outer sleeve 16 away from seat 34 in an axial direction. This process of engagement, applying the locking force, removing the locking force, and disengagement can be repeated to assemble or disassemble a string associated with the tube or rod 30.

The apparatus 10 may be adapted to communicate with a passage located in hollow tube or rod. In this regard, in the embodiment of FIG. 3, a tube or rod 150 comprises a central passage 152. Likewise, apparatus 10 comprises a cavity 44 that is able to communicate with passage 152. In this way, fluids may be pumped into or out of passage 152. For example, if tube or rod 150 is associated with a flushby rig, fluids can be pumped through cavity 44 and into passage 152, where the fluid would exit at the end of the string associated with tube or rod 150. The cavity 44 may be tapered and have other structural features to allow efficient fluid flow into and/or out of passage 152. As an example, the cavity 44 may taper down towards the passage 152 so that a diameter of an opening at an exit of the cavity 44 is approximately the same diameter as passage 152 to thereby provide a seamless transition between the cavity 44 and passage 152. The cavity 44 may also be fitted with valves, pressure and/or flow regulators to control the flow of fluid into and out of passage 152. Typically, the size and shape of cavity 44 will be determined by the type of fluids that will flow through cavity 44 e.g. drilling mud, and the size of the passage 152.

Figure 4:
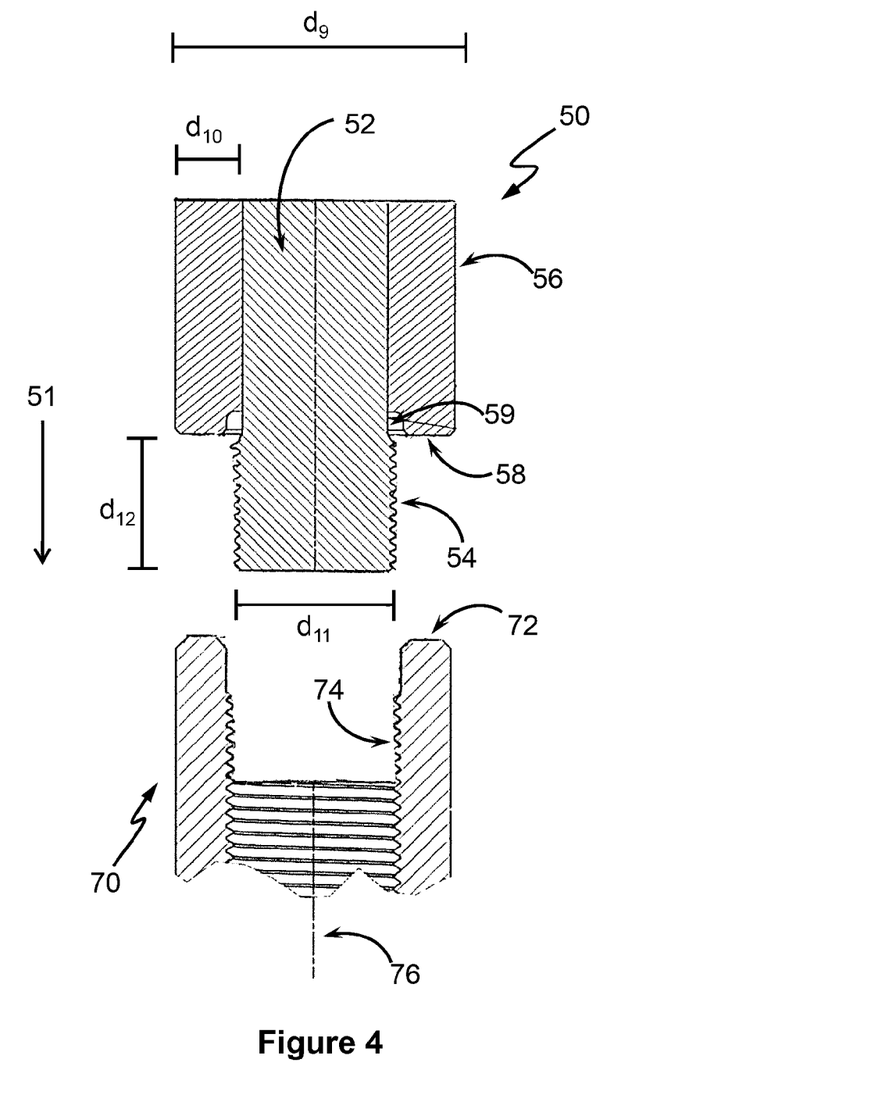
FIG. 4 shows a cross-sectional view of another apparatus disconnected from a tube or rod.
Figure 5:
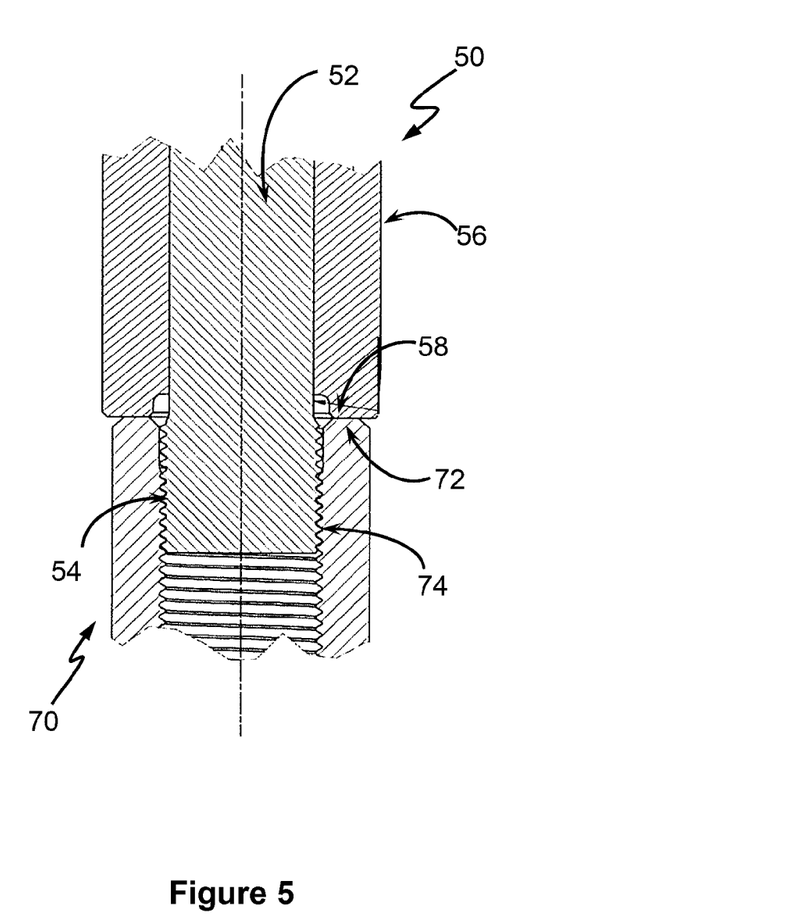
FIG. 5 shows a cross-sectional view of the apparatus of FIG. 4 connected to a tube or rod.

Another embodiment of the apparatus is shown in FIGS. 4 and 5. In this embodiment, apparatus 50 takes a different form and is provided with an engagement member in the form of a tubular member acting as inner bolt 52 coaxially arranged with abutment member in the form of tubular member acting as outer sleeve 56, where outer sleeve 56 sleeves inner bolt 52 so that the two share a central axis (e.g. 76). The coaxial arrangement can allow for a slideable engagement along a direction of the central axis (i.e. in the direction of arrow 51) of the inner bolt 52 relative the outer sleeve 52.

Inner bolt 52 has an externally threaded (male) portion 54 that is adapted to engage at an end of tube or rod 70, namely, with an engagement portion in the form of internal threads 74 located on a female (internal) surface of a cavity of tube or rod 70. Threaded region 54 and thread 74 are complementary to allow for screw engagement. Again, other forms of engagement (e.g. bayonet, etc.) can instead be employed. A diameter of the inner bolt 52 (i.e. distance $d_{11}$) is determined by the type of tube or rod, similar to that described for the embodiments of FIGS. 1 and 2.

In the embodiment shown in FIGS. 4 & 5, the tube or rod 70 is shown in the "box up" orientation. In this way, the apparatus 50 is adapted to screw into tube or rod 70, so the apparatus 50 can now be considered as forming a pin.

Outer sleeve 56 has a wall thickness (distance $d_{10}$) which is determined by the diameter of the outer sleeve 56 (distance d9) and the diameter of the inner bolt 52 (distance d11). The outer sleeve 56 also has a radially extending flange that forms an end 58 that is adapted to abut a radially extending end portion 72 of the tube or rod 70. A circumferential recess 59 extends around an inner surface of the outer sleeve 56. The circumferential recess 59 provides a space for the threaded region 54 to sit in when the outer sleeve 56 is moved along the central axis towards threaded region 54 so that the threaded region 54 does not engaged with an inner wall of the outer sleeve 56. The circumferential recess 59 means a width of the seat 58 is less than the wall thickness of the outer sleeve 56. However, the circumferential recess is not always required, so in some embodiments the width of the seat 58 is the same as the wall thickness of the outer sleeve 56.

Figure 3:
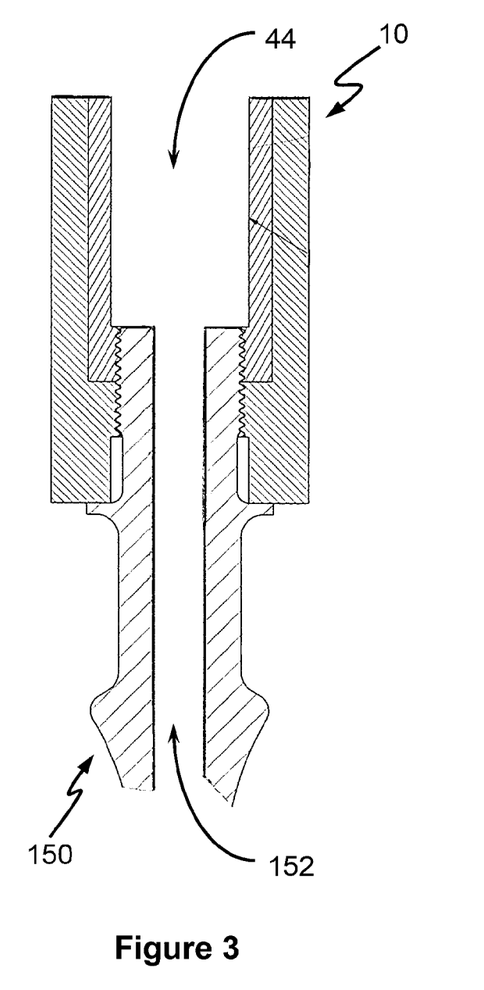
FIG. 3 shows a cross-sectional view similar to the apparatus of FIG. 2 but connected to a tube or rod having a passage.

Similar to the embodiments of FIGS. 1 to 3, the threaded region 54 of inner bolt 52 can be screwed into threads 74 so as to engage apparatus 50 with tube or rod 70. A length of the threaded region 54 (i.e. distance $d_{12}$) will be determined by the dimensions of the box (i.e. the internally threaded region) of the tube of rod 70. A diameter of the outer sleeve 56 is about 90% to about 120% of the maximum upset diameter of the tube or rod 70.

Once the apparatus 50 has been screwed down into the tube or rod 70, the end 58 abuts end portion 72, as shown in FIG. 5. Further, once end 58 abuts end portion 72, outer sleeve 56 is adapted to move towards end portion 72 in an axial direction, represented by axis 76 of the tube or rod 70, so as to apply a force onto end 72. Similar to the embodiments of FIGS. 1 to 3, once the force reaches a predetermined level, a locking force is achieved in which the threaded region 54 is secured (e.g. locked) to thread 74. Once this locking force has been achieved, the apparatus is able to lift and move the tube or rod 70.

As already described, when end 58 abuts end portion 72, complementary faces of threaded region 54 and thread 72 should abut one another. This means that the outer sleeve 56 only needs to move a small distance to provide the locking force since the force exerted from the end 58 onto end portion 72 should increases as soon as outer sleeve 56 is caused to move further towards end portion 72. The outer sleeve 56 may move less than 1 mm, such as 0.3 mm, in a direction towards the end portion 72. The amount of force applied to end portion 72 by outer sleeve 56 equates to a locking force of approximately 650 Nm of torque. Forces which equate to a locking force of approximately 20,000 Nm of torque or more, such as 50,000 Nm can be applied. Similar to outer sleeve 16, outer sleeve 56 can be moved by a linear actuator (not shown). The linear actuator can be associated with the head 11 (see FIG. 7). The linear actuator can be electric, hydraulic or pneumatic. Inner bolt 52 may be connected to a motor to allow rotation around the axis of inner bolt 52. The outer sleeve 56 may also be connected to a motor to allow for rotation. The inner bolt 54 may be able to rotate independently of the outer sleeve 56.

While the apparatus 50 shown in FIGS. 4 & 5 does not have a cavity, a cavity can be provided in the apparatus 50 to allow for fluid communication with a channel in the tube or rod 70, similar to the embodiment shown in FIG. 3. The shape and configuration of the cavity can be as already described. In some embodiments, outer sleeve 56 has a threaded region that continues from inner bolt 54 so that when apparatus 50 is engaged with thread 74, the thread from the outer sleeve 56 and inner bolt 54 are both engaged with thread 74 (not shown), but the outer sleeve 56 is still allowed to move in an axial direction to apply a force to the end portion 72. This is similar to the embodiments described for FIGS. 1 and 2.

Figure 6:
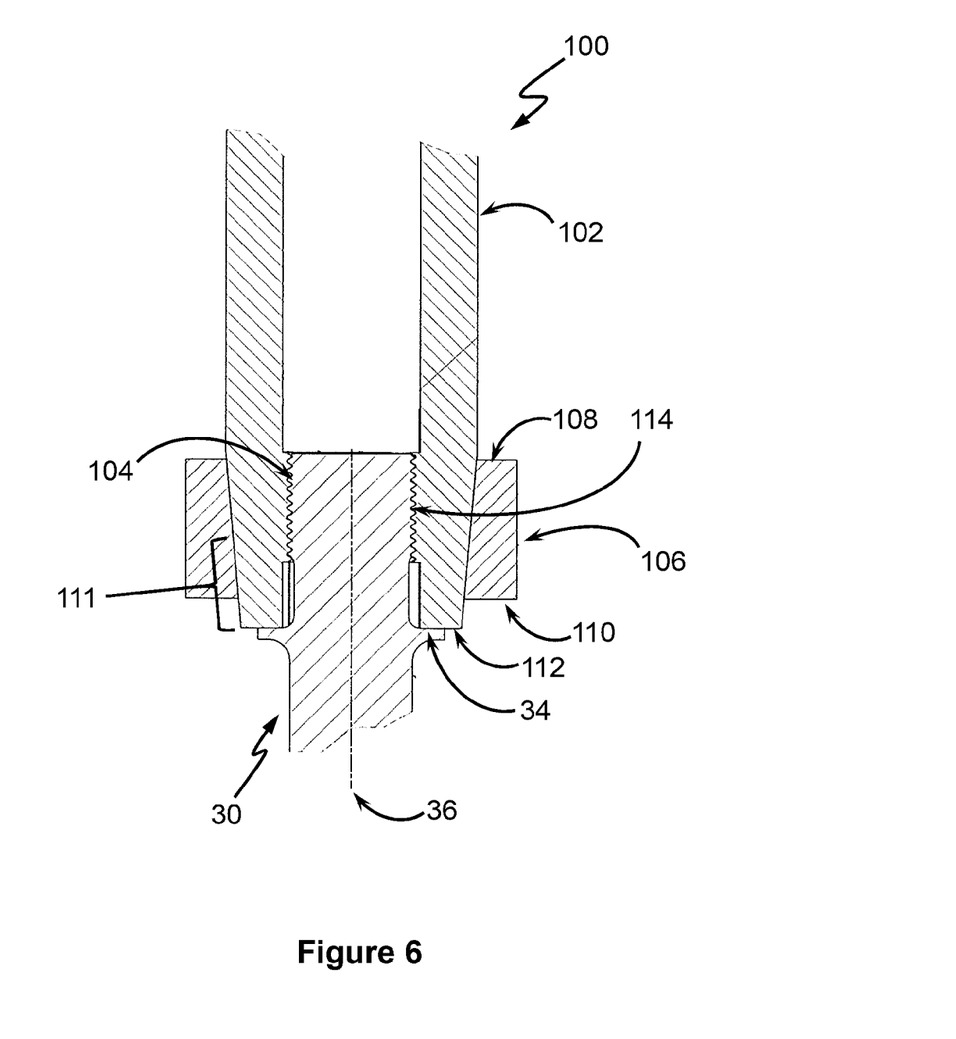
FIG. 6 shows a cross-sectional view of a further apparatus connected to a tube or rod.

A further embodiment of an apparatus is shown in FIG. 6. In this embodiment, apparatus 100 is provided with an engagement member in the form of hollow tube 102, and an abutment member that takes the form of an auxiliary abutment member 106. The auxiliary abutment member 106 sleeves abutment region 111, with the abutment region 111 being associated with the hollow tube 102. The apparatus 100 is adapted to be secured to tube or rod 30 via an engagement portion located at one end of the tube or rod 30. In the embodiment of FIG. 6, the engagement portion takes the form of a thread 104 to form the apparatus in a "box" configuration. The hollow tube 102 has an internally threaded region 114 that is complementary to thread 104 to allow for screw engagement.

Apparatus 100 is adapted so that a radially extending end surface 112 of the abutment region 111 abuts seat 34 when the apparatus is screwed onto thread 104. As described in more detail below, to provide the locking force, the auxiliary abutment member 106 is moved relative to the abutment region 111 so as to compress the abutment region 111. This causes the end surface 112 to move towards seat 34 as well as inwards towards threads 104. In this way, the auxiliary abutment member 106 and abutment region 111 can apply a radial compressive force in addition to the locking force.

More specifically, the auxiliary abutment member 106 is tapered, having a wider opening towards a first end 108 compared with to its second end 110. In this way, the auxiliary abutment member can be considered as forming a tapered sleeve. The abutment region 111 and part of the hollow tube 102 has a complementary taper on its outer surface. Therefore, as the auxiliary abutment member 106 is caused (e.g. urged) to move up the taper, the internally narrower second end 110 applies more compressive force the further it is moved up the abutment region 111 at that part of the hollow tube 102. To accommodate the inwards movement of the abutment region and to facilitate applying the compressive force, the bottom portion of hollow tube 102 may be provided as a radial split nut. The nut can have one or more splits.

The auxiliary abutment member 106 may be moved by a linear actuator, such as a hydraulic ram associated with a head of the apparatus 100. However, in an alternative form, the auxiliary abutment member 106 is fixed and the hollow tube 102 and abutment region 111 move down relative to the auxiliary abutment member 106. As the hollow tube 102 and abutment region 111 are moved down, the second end 110 causes end 112 to apply force to seat 34 and to cause abutment region 11 to apply a compressive force on thread 104.

Whatever means is used to move auxiliary abutment member 106, the sum of the locking force and compressive force can be approximately equivalent to at least 650 Nm of torque, such as approximately 20,000 Nm. Similar to the embodiments shown in FIGS. 1 to 5, the apparatus 100 can be screwed onto tube or rod 30 until end 112 abuts seat 34 so as to be "finger tight". The apparatus 100 is then secured to the tube or rod 30 once the locking force is applied. To disengage apparatus 100 from tube or rod 30, the auxiliary abutment member 106 is moved to release the compressive and locking force, and then the apparatus can be unscrewed from thread 104.

While a solid tube or rod 30 is illustrated in FIG. 6, a hollow tube or rod having a passage therethrough (e.g. tube or rod 150) can be used.

Figure 7:
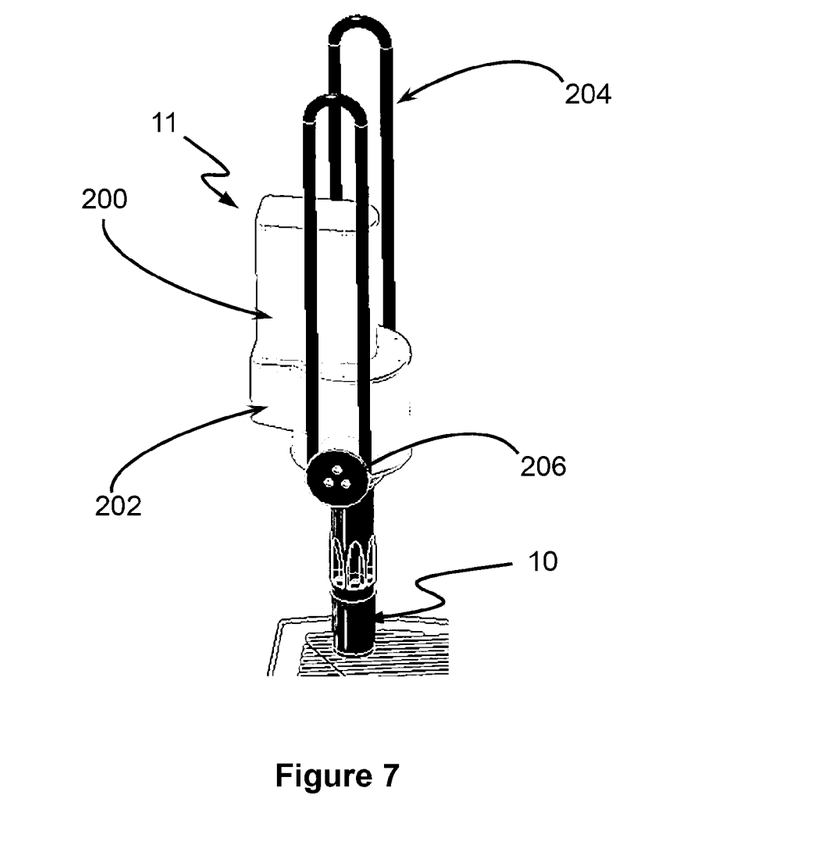
FIG. 7 shows a perspective view of the apparatus in use.

The apparatus 10/50/100 can be connected to a motor and gearbox. In this regard, and as shown in FIG. 7, the apparatus 10 has a head 11 that can take the form of a gearbox 202 and a motor 200. The motor can be electric or hydraulic. The gearbox 202 and/or motor 200 may be connected to the linear actuator that moves abutment member 16/56/106. The gearbox 202 is associated with the inner sleeve 12 and outer sleeve 16 so as to rotate the apparatus 10. Since the apparatus 10 is able to rotate, the threaded region 14 can be screwed directly to thread 32 without the need for physical operator input. In this way, the tube or rod can be secured in a hands-free manner. This can be useful when attaching apparatus 10 to stationary tube or rod 30, for example tube or rod stored on a catwalk. In this way, apparatus 10 may form part of a system having tube or rod 30, where the system can facilitate the assembly and disassembly of a string. The system may allow hands-free assembly and disassembly of the string.

Since inner sleeve 12 and outer sleeve 16 are coaxially arranged in the embodiments of FIGS. 1 to 3, they can also be in slideable contact with each other. The gearbox 202 can be adapted so that the inner sleeve 12 and abutment 16 can rotate independently of each other. In some embodiments, only one of the inner sleeve 12 and outer sleeve 16 is allowed to rotate. The also same applies to the embodiments of FIGS. 4 and 5.

As also shown in FIG. 7, a pivot member 206 and sling 204 are associated with the head 11 of the apparatus 10. For the embodiment in FIG. 7, the pivot member 206 is mounted at a base of the gearbox 202. The pivot member 206 sits in sling 204 and allows the apparatus 10 to rotate relative to a longitudinal axis of the sling 204. The sling 204 is connected to a rope associated with a rig, such as a drill rig, a workover rig, a flushby rig or a data gathering rig (not shown), and is generally orientated in a vertical direction in use. Once the apparatus 10 has been secured to the tube or rod, the rope can lift the tube or rod into its necessary position e.g. forming a string. While two slings are illustrated in FIG. 7, the head 11 may have one, or more than two slings. Further, there can be one pivot member associated with each sling.

Tube or rod stored on a catwalk may not always be orientated vertically. Therefore, allowing apparatus 10 to rotate around pivot member 206 can allow the apparatus 10 to engage and disengage with tube or rod in different orientations e.g. in a substantially horizontal manner, or laying at an angle relative to horizontal, or in a substantially vertical manner. This can allow the apparatus 10 to engage and disengage with tube or rod without requiring any physical assistance from an operator. Therefore, the apparatus 10 may be able to engage and disengage and be secured/unsecured with tube or rod in a hands-free manner. This can help to reduce the occurrence of operators being placed in a hazardous working situation.

If the tube or rod is stored in an orientation that is not substantially vertical, e.g. on a catwalk, then the apparatus 10 may have to rotate relative to the sling 204 between a first orientation to engage and secure with the tube or rod, and a second orientation to disengage from and release the tube or rod. For example, for tube or rod stored horizontally on a workover rig, the apparatus 10 can rotate to a first orientation so that an axial direction of the apparatus 10 is horizontal to engage/disengage with the tube or rod, then the apparatus can rotate to a second orientation so that the apparatus can disengage/engage, respectively, with the tube or rod to assemble/disassemble a tube or rod string. The order of engagement/disengagement of the apparatus 10 with tube or rod is determined by whether a tube or rod string is being assembled or disassembled.

Allowing the apparatus 10 to rotate relative to sling 204 can allow the apparatus 10 to engage/secure and disengage/release without physical input from an operator. To do this, the rotation member may have an adjustment mechanism to allow the apparatus 10 to rotate relative to the sling 204. The adjustment mechanism may be associated with the rotation member 206 or may be separate from the rotation member. For example, the rotation member 206 may be fixed to the sling 204, with the rotation member 206 being fixed to a motor and/or gear arrangement that can rotate the apparatus 10. This may allow for automated rotation of apparatus 10 relative to the sling 206. Sensors may be provided that communicate with the apparatus to determine the angle of rotation relative to the sling 10. The sensors may be in communication with the adjustment mechanism. The head 11 of the apparatus may have a counterweight to stabilise the apparatus when rotating the engaged tube or rod.

A string associated with tube or rod is generally rotated in use by components associated with a rig, such as a Kelly drive or other rotation devices. Therefore, the apparatus 10 and/or head 11 may be adapted to accommodate the rotation of the string. For example, the head 11 may disengage motor 200 and/or gearbox 200 from inner sleeve 12 and/or outer sleeve 16 to allow the apparatus 10 to rotate in response to the string e.g. at the same revolutions per minute as the string. Alternatively, the motor 200 and/or gearbox 202 may be adapted so as to rotate apparatus 10 at the same revolutions per minute as the string. Allowing the apparatus 10 to rotate in response to rotation of the string and/or at the same revolutions per minute as the string means that introduction of torsional forces may be minimised during rotation of the string. This can also help to reduce any torque applied to the rope. In another form, the motor 200 and gearbox 202 of head 11 may be configured to act as a Kelly drive so as to rotate the string. In these circumstances, the head 11 may be fitted with additional supports so as to distribute loads such as torque to a structure associated with the rig. The structure associated with the rig may be a cradle. The cradle may be associated with a work deck of a rig.

Because the sling 204 is attached to rope, such as wire rope, any torque applied to the tube or rod 30 by apparatus 10 when engaging threaded region 14 and/or 18 to thread 32 is generally transferred to the rope. Therefore, the maximum amount of torque that the apparatus can provide is determined by the amount of torque the rope is rated to withstand. Generally, rope associated with rigs such as a drill rig, a workover rig, a flushby rig or a data gathering rig is designed to distribute loads along the length of the rope, and they are typically relatively poor at withstanding torsional forces. Thicker ropes can generally withstand more torsional forces than thinner ropes. For example, wire rope with a diameter of 34 mm can generally withstand up to 250 Nm of torque. In this way, the amount of torque required to engage threaded region 14 with threads 32 should be less than the rated capacity of the rope. However, since the majority of the force required to secure apparatus to 10 to tube or rod 30 is provided by the locking force, the amount of torque required is generally less than 250 Nm i.e. is "finger tight".

The head 11 of the apparatus 10 may have a goose-neck or other similar arrangement to allow communication of fluid from a Kelly hose or any other hose used to pump fluid into and out of passage 152. The goose-neck or similar arrangement may be configured to allow rotation of the apparatus 10 relative to sling 204. For example, the Kelly hose may be connected to head 11 with a portion of flexible hose.

While the relationship between the head 11 has been described with reference to apparatus 10, it should be appreciated that the head 11 can also be applied to apparatus 50 and 100 to allow for rotation of the engagement member, movement of abutment members and so on.

To connect apparatus 10 to tube or rod 30, the inner sleeve 12 is engaged to the engagement portion (i.e. thread 32) by screwing the threaded region 14 of the inner sleeve 12 onto thread 32. Threaded region 14 is screwed onto thread 32 until the end 20 of outer sleeve 16 abuts seat 34. The outer sleeve 16 is then caused to move further in an axial direction 36 so as to apply the locking force onto seat 34. Once the locking force has been reached, the inner sleeve 12 is lockingly secured to the thread 32 by threaded region 14. Since the apparatus 10 provides the locking force, there may be no need for physical operator input. Therefore, apparatus 10 may be used for hands-free assembly/disassembly of a string.

Once the apparatus 10 is secured to rod or tube 30, the tube or rod 30 may be moved, for example, by using rope attached to the head 11. If assembling a string, the tube or rod 30 is generally stored on a catwalk. Once secured, apparatus 10 and tube or rod 30 are then moved from the catwalk to be positioned vertically over the wellhead, or at an angle so that the axis of the tube or rod is aligned with the axis of the well/string. The tube or rod 30 is then rotated so as to screw that end of the tube or rod 30 that is opposite the apparatus 10 into a string positioned in the well. Alternatively, a rotation member associated with the string may rotate the string so as to engage the tube or rod 30 already secured to apparatus 10. In this instance, the apparatus 10 would not rotate, so as to keep the tube or rod 30 fixed in position. In either case, the string can then be inserted into the well.

When another section of tube or rod 30 is required to be added to the string, the apparatus can be unsecured from the tube or rod 30 by moving outer sleeve 16 to release the locking force, and then unscrewing the inner sleeve 12 from thread 32. The apparatus can then be moved to the catwalk to be secured to another section of tube or rod 30 to continue the process of assembling the string. To disassemble the string, the above procedure is reversed. In this way, a drill string can be assembled and/or disassembled using the apparatus 10. Since the apparatus 10 can be secured to tube or rod 30 in a hands-free manner, a drill string may also be assembled and/or disassembled in a hands-free manner.

Other sensors may be associated with apparatus 10. For example, a sensor can be used to determine the torque being applied when the inner sleeve 12 is being screw onto thread 32.

If the torque exceeds a predetermined maximum value, then the apparatus can slow or stop the screwing operation. In these circumstances, an alarm can sound to instruct an operator to inspect apparatus 10. Torque sensors can also be used to determine when outer sleeve 16 begins abutting seat 34.

Load sensors can also determine the amount of force being applied to seat 34 when the outer sleeve 16 is moved to apply the locking force. Once a load associated with the locking force is reached, the load sensor can then instruct the actuator responsible for moving the outer sleeve 16 to stop moving. If the locking force cannot be reached, the load sensor can prevent further movement of the apparatus until the locking force is reached. The use of sensors can also assist in providing hands-free operation of apparatus 10.

Programmable computer logic (PCL) can be used to control the apparatus 10. For example, the PCL may only instruct the outer sleeve 16 to apply the locking force once it is determined that the outer sleeve 16 is abutting seat 34. Apparatus 10 can be associated with one or more computers and/or computer systems. The sensors associated with apparatus 10 can be in communication with each other through the PCL, and the one or more computers and/or computer systems.

The same principles used to describe the use of apparatus 10 can also be applied to apparatus 50 and 100 to assemble and/or disassemble a string associated with tube or rod 30/70/150.

It will be understood to persons skilled in the art that many modifications may be made without departing from the spirit and scope of the apparatus, system and method as set forth herein.

In the claims which follow and in the preceding description of the apparatus, system and method, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the apparatus, system and method.

The invention claimed is:

1. A lifting apparatus for connecting to and lifting a tube or a rod having a threaded portion where the tube or rod is used in the assembly of a tube or rod string, the apparatus comprising:
   a first tubular member and a second tubular member, the first and second tubular members being coaxially arranged around a central axis and movable relative to one another along the central axis, wherein the second tubular member is disposed inside the first tubular member;
   a threaded region on the second tubular member, the threaded region being complementary to the threaded portion on the tube or rod;
   a threaded region on the first tubular member having a same thread pitch as the threaded region on the second tubular member so that the threaded regions on the first and second tubular members form a continuous thread that is complementary to the threaded portion on the tube or rod; and
   a radially extending flange located at an end of the first tubular member for abutting a portion on the tube or rod,
   wherein, when the threaded region of the second tubular member is engaged with the threaded portion on the tube or rod and the radially extending flange abuts the portion of the tube or rod, the first tubular member is movable along at least a portion of a length of the central axis relative to the second tubular member to apply a locking force along the central axis to the portion of the tube or rod in engagement with the flange to secure the apparatus to the tube or rod.

2. An apparatus as claimed in claim 1, wherein the threaded region on the first tubular member is provided as a male thread.

3. An apparatus as claimed in claim 1, wherein the second tubular member has a conduit to allow for communication of a fluid through the apparatus.

4. An apparatus as claimed in claim 3, wherein the first tubular member has a conduit to allow fluid communication with the conduit of the second tubular member.

5. An apparatus as claimed in claim 1, further comprising a ram associated with the first and/or second tubular members for moving the first and second tubular members relative to one another along the central axis.

6. An apparatus as claimed in claim 1, wherein the first and second tubular members are rotatable around the central axis so as to be moveable relative to one another in a circumferential direction.

7. A system comprising:
   a tube or rod having a threaded portion located at an end of the tube or rod;
   an apparatus including a first tubular member and a second tubular member, the first and second tubular members being coaxially arranged around a central axis and movable relative to one another along the central axis, wherein the second tubular member is disposed inside the first tubular member, wherein the first tubular member includes a first threaded region and the second tubular member includes a second threaded region configured to engage with the threaded portion of the tube or rod, and wherein the first and second threaded regions have a same thread pitch; and a radially extending flange located at an end of the first tubular member, the radially extending flange configured to abut an abutment portion of the tube or rod, wherein, when the second threaded region of the second tubular member is engaged with the threaded portion of the tube or rod and the radially extending flange abuts the abutment portion of the tube or rod, the first tubular member is movable along at least a portion of a length of the central axis relative to the second tubular member to apply a locking force to the portion of the tube or rod in engagement with the flange to secure the apparatus to the tube or rod.

8. A system as claimed in claim 7, wherein the system is configured to be used on a drill rig, a workover rig, a flushby rig or a data gathering rig.

9. A system as claimed in claim 7, further comprising a catwalk or other structure for storing and/or presenting the tube or rod.

10. A method for securing a lifting apparatus to a tube or a rod having a threaded portion where the tube or rod is used in the assembly of a tube or rod string, the method comprising:

disposing a second tubular member inside a first tubular member, the first and second tubular members being coaxially arranged around a central axis and movable relative to one another along the central axis, the second tubular member comprising a threaded region, the threaded region being complementary to the threaded portion of the tube or rod, the first tubular member comprising a threaded region having a same thread pitch as the threaded region of the second tubular member so that the threaded regions on the first and second tubular members form a continuous thread that is complementary to the threaded portion of the tube or rod, the first tubular member further comprising a radially extending flange located at an end of the first tubular member for abutting an abutment portion of the tube or rod;

engaging the threaded region of the second tubular member with the threaded portion of the tube or rod such that the radially extending flange of the first tubular member abuts the abutment portion of the tube or rod; and moving the first tubular member along at least a portion of a length of the central axis relative to the second tubular member to apply a locking force along the central axis to the abutment portion of the tube or rod in engagement with the radially extending flange to secure the lifting apparatus to the tube or rod.

* * * * *